United States Patent Office 3,183,206
Patented May 11, 1965

3,183,206
PROCESS FOR THE PRODUCTION OF SELF-SEALING ORGANO-POLYSILOXANE COMPOSITIONS
Wilfried Kniege, Cologne-Mulheim, and Karl Schnurrbusch, Cologne-Flittard, Germany, assignors to Farbenfabriken Bayer Aktiengesellschaft, Leverkusen, Germany, a corporation of Germany
No Drawing. Filed June 13, 1962, Ser. No. 202,071
Claims priority, application Germany, June 14, 1961,
F 34,170
7 Claims. (Cl. 260—37)

The invention concerns an improvement of self-sealing organo-polysiloxane compositions.

Organo-polysiloxane elastomers are known, the surfaces of which not only adhere to foreign surfaces after pressures, but also stick together. They are used, e.g., for the production of self-sealing insulating strips and for the coating of glass, wood and metal. They are also suitable as adhesives for the joining of two surfaces of finished, converted, non-self-sealing organo-siloxane elastomers.

It is known to bring about such special adhesion properties of elastomeric organo-polysiloxane products by the previous admixing of boric acid, boric acid esters or boron triacetate. A larger admixture of boron nitride also has a similar effect, as is to be assumed because of its low content of boric acid.

Self-sealing insulating strips are produced, for example, by mixing organo-polysiloxanes, which can be converted into elastomers, with boric acid, usual fillers and curing agents, and forming strips therefrom by means of machines usually employed in the rubber industry. Subsequent to the forming, the strips are slightly cured and wound up into rolls, whereby a separating foil of inert material, e.g., polyethylene, must always be interleaved in order to prevent a premature adhesion of the windings with one another. If, for the purposes of application and after the removal of the separating foil, these insulating strips are wound in the usual manner on to objects, then, during a certain period of storage time, an adhesion of the insulating strip windings lying on one another can occur. In the case of the previously known strips of this type, a satisfactory adhesion only occurs, however, when the strips are protected before application from moisture. The use of strips of this kind is thereby already made considerably difficult and, furthermore, by the fact that the adhesiveness of the final strip insulation is only to be removed by subsequent heating.

It has now been found that the above disadvantages are avoided when, in addition to one of the known curing agents, e.g., an organic peroxide, there is used, instead of the previously employed boron compounds, a boron-hydrogen compound which can be an alkyl-substituted boron hydride, e.g., a dialkyl borane, or the compound of a boron hydride and an alkylamine, e.g., an N-dialkyl- or N-trialkyl-borazane, an N-dialkyl-borazene or an N-alkyl-borazine, known in the cyclic trimeric form as trialkyl-borazole. The proportion of the boron-hydrogen compounds in the self-sealing organo-polysiloxanes according to the invention amounts to between 0.02 and 10, preferably between 0.2 and 3 percent of the total weight, depending on the desired intensity of adhesion.

In the process according to the invention, there are used the usual organo-polysiloxanes convertible to the cured, solid, elastic state, and the usual curing agents, such as organic peroxides, as well as the known further additives, especially fillers, e.g., finely-divided silicic acid, kieselguhr, quartz, iron-, titanium-, aluminum-, and zinc-oxide. The addition of the boron-hydrogen compound can take place together with the previously-mentioned components during the preparation of the mixture ready for curing; however, it is also possible to proceed in such a manner that the boron hydrogen compound is already added to the low molecular organo-polysiloxanes which are then further polymerized in known manner to the highly viscous convertible siloxanes. It is possible to use in this case the conventional polymerization catalysts, however, a mere heating can be sufficient. It appears possible that the boron is already bound in the polymer during polymerization.

If strips or coatings are formed in known manner from the mixtures according to the invention and then slightly cured, the same adhesive properties are initially obtained as in the case of the mixtures known in the art. As these, they also lose their adhesiveness by complete conversion. However, whereas the known cured products lose their ability to stick to one another in this way, the organo-polysiloxane compositions according to the invention, surprisingly, stick to one another completely, even after intensive curing leading to a completely non-adhesive state, when the strips of these cured products are wound round the objects to be insulated with tensional elongation.

This property offers the advantage that the strips can be wound up and stored in rolls in the fully cured, solid, elastic condition. The use of separating foils and the subsequent curing of the finished insulation is thereby rendered unnecessary without having to take into account residual adhesiveness or having to abandon the improvement of the dielectric value of the polysiloxane known to be achieved by curing. Furthermore, the siloxane compositions according to the invention are characterized in that they are insensitive to moisture in the atmosphere both in the pre-cured, still adhesive state, and in the completely cured condition and, therefore, require no special storage conditions.

The admixture of the boron hydrogen compounds as curing agents to the poly-diorgano-siloxanes has already been suggested, however not in combination with, but as substitutes for other curing agents, such as organic peroxides. The unusual adhesive properties obtained according to the invention are not achieved in the manner previously suggested.

The following examples are given for the purpose of illustrating the invention.

Example 1

100 g. of $\alpha,\omega$-dihydroxy-polydimethyl-siloxane of approximately 10,000 CS. viscosity are mixed with 1 g. of N-triethyl-borazane $(C_2H_5)_3NBH_3$ and the mixture heated for one hour at 150° C., whereby the viscosity increases to about 5,000,000 CS. The so-obtained polymerizate is mixed with 40 g. of finely divided silicic acid and 1.2 g. of bis-(2,4-dichlorobenzoyl)-peroxide. This mixture as well as the products obtained according to the following Examples 2 to 5, can be formed in any desired manner and can be converted in known manner by heat treatment.

Example 2

100 g. of an organo-polysiloxane, which is produced in known manner by copolymerization of octamethyl-cyclotetrasiloxane and tetramethyl-tetravinyl-cyclotetrasiloxane in a ratio by weight of 500:1 by means of potassium hydroxide, are mixed with 30 g. of finely divided silicic acid, 8 g. of iron oxide powder, 0.6 g. of bis-(2,4-dichlorobenzoyl)-peroxide and 0.8 g. of N-dimethyl-borazane, $(CH_3)_2NHBH_3$.

Example 3

100 g. of the same organo-polysiloxane as in Example 2 is mixed with 5 g. of diphenyl-silane-diol, 30 g. of finely divided silicic acid, 1 g. of bis-(2,4-dichlorobenzoyl)-peroxide and 1 g. of N-diethyl-borazene $$(C_2H_5)_2NBH_2$$

Example 4

100 g. of the same organo-polysiloxane as in Examples 2 and 3 is mixed with 30 g. of finely divided silicic acid, 0.8 g. of bis-(2,4-dichlorobenzoyl)-peroxide and 1 g. of N,N',N''-tri-n-butyl-borazole $(C_4H_9NBH)_3$, i.e., the cyclic trimeric form of N-n-butyl-borazine.

Example 5

100 g. of an organo-polysiloxane, which is produced in known manner by the copolymerization of octamethyl-cyclotetrasiloxane and octaphenyl-cyclotetrasiloxane in a ratio by weight of 17:3 by means of potassium hydroxide, is mixed with 20 g. of finely divided silicic acid, 80 g. of kieselguhr, 5 g. of zinc oxide, 5 g. of iron oxide, 2.2 g. of bis-(2,4-dichlorobenzoyl)-peroxide and 0.5 g. of di-n-propyl-diborane, $(C_3H_7)_2B_2H_4$.

From the mixtures obtained according to Examples 1 to 4, there were prepared, by means of an extruder usual in the rubber industry, 10 mm. wide and 0.5 mm. thick strips which were immediately continuously cured in hot air at 350° C. After a curing time of 5 seconds, the strips were still sticky but no longer after a curing time of 25 seconds. The strips cured for a short period of time were rolled up with a separating foil of polyethylene as intermediate layer and the fully converted strips were rolled up without an intermediate layer. Independently of the temperature and of the surrounding moisture during the storing, both types of cured products gave fully sealed windings when the strips were wound round a rod under tension.

For the production of an insulated cable, a mixture obtained according to Example 5 was applied in known manner to a copper conductor which was then heated for 15 hours at 200° C. The cable was then coated with a mixture which did not contain dipropyl-borane but was otherwise of the same composition as that according to Example 5. The two layers stuck together completely homogeneously. On the other hand, no adhesion occurred when the experiment was repeated with the difference that the first layer also contained no dipropyl-borane.

We claim:

1. Process for the production of self-sealing moisture-insensitive-organo-polysiloxane elastomers, which comprises forming a mixture of 45 to 75% by weight of a poly-dihydrocarbosiloxane convertible to the cured, solid, elastic state, 20 to 50% by weight of a filler selected from the group consisting of silica, iron oxide, titanium oxide, aluminum oxide, zinc oxide, and mixtures thereof, 0.4 to 1% by weight of an organic peroxide and 0.02 to 10% by weight of a boron hydrogen compound selected from the group consisting of alkyl-substituted boron hydrides, N-alkyl-substituted borazanes, N-alkyl-substituted borazenes, N-alkyl-substituted borazines, and thereafter heating the mixture to a temperature of about 350° C. to effect production of the self-sealing-moisture-insensitive-organo-polysiloxane elastomer.

2. Process according to claim 1, wherein the heating is continued for a time sufficient to effect production of an elastomer which is non-adhering to other surfaces than that of the elastomer.

3. Process for the production of self-sealing, moisture-insensitive-organo-polysiloxane elastomers, which comprises forming a mixture of 70% by weight α,ω-dihydroxy-polydimethyl-siloxane, 0.7% by weight N-triethyl-borazane, 28% by weight silica, and 0.8% by weight bis-(2,4-dichlorobenzoyl)-peroxide, and thereafter heating the mixture to a temperature of about 350° C. to effect production of the self-sealing, moisture-insensitive-organo-polysiloxane elastomer.

4. Process for the production of self-sealing, moisture-insensitive-organo-polysiloxane elastomers, which comprises forming a mixture of 72% by weight of an organo-polysiloxane, prepared by copolymerizing octamethyl-cyclotetrasiloxane and tetramethyl-tetravinyl-cyclotetrasiloxane in a ratio by weight of 500:1, 21% by weight of silica, 6% by weight of iron oxide, and 0.4% by weight of bis-(2,4)-dichlorobenzoyl-peroxide and 0.6% by weight of N-dimethyl-borazane, and thereafter heating the mixture to a temperature of about 350° C. to effect production of the self-sealing-moisture-insensitive-organo-polysiloxane elastomer.

5. Process for the production of self-sealing, moisture-insensitive-organo - polysiloxane elastomers, which comprises forming a mixture of 73% by weight of an organo-polysiloxane prepared by copolymerizing octamethyl-tetrasiloxane and cyclo-tetramethyl-tetravinyl-cyclotetrasiloxane in weight ratio of 500:1, 4% by weight of diphenyl-silanediol, 22% by weight of silica, 0.7% by weight of bis(2,4-dichloro-benzoyl)-peroxide, and 0.7% by weight of N-diethylborazene, and thereafter heating the mixture to a temperature of about 350° C. to effect production of the self-sealing-moisture-insensitive-organo - polysiloxane elastomer.

6. Process for the production of self-sealing, moisture-insensitive-organo - polysiloxane elastomers, which comprises forming a mixture of 70% by weight of an organo-polysiloxane prepared by copolymerizing octamethylcyclotetrasiloxane and tetramethyl-tetravinyl-cyclotetrasiloxane in a weight ratio of 500:1, 20% by weight of silica, 0.6% by weight of bis-(2,4-dichlorobenzoyl)-peroxide and 0.7% by weight of N,N',N''''-tri-n-butyl-borazole, and thereafter heating the mixture to a temperature of about 350° C. to effect production of the self-sealing-moisture-insensitive-organo-polysiloxane elastomer.

7. Process for the production of self-sealing, moisture-insensitive-organo-polysiloxane elastomers, which comprises forming a mixture of 47% by weight of an organo-polysiloxane prepared by copolymerizing octamethylcyclotetrasiloxane and octaphenyl-cyclotetrasiloxane in a weight ratio of 17:3, 9% by weight of silica, 36% by weight of kieselguhr, 2% by weight of zinc oxide, 2% by weight of iron oxide, 1% by weight of bis-(2,4-dichlorobenzoyl)-peroxide, and 0.2% by weight of di-n-propyl-diborane, and thereafter heating the mixture to a temperature of about 350° C. to effect production of the self-sealing-moisture-insensitive-organo-polysiloxane elastomer.

References Cited by the Examiner

UNITED STATES PATENTS

| | | | |
|---|---|---|---|
| 2,442,613 | 6/48 | Nicodemus | 260—46.5 |
| 2,558,560 | 6/51 | Safford | 260—46.5 |
| 2,558,561 | 6/51 | Safford | 260—46.5 |
| 3,050,490 | 8/62 | Nitzsche et al. | 260—37 |
| 3,050,491 | 8/62 | Nitzsche et al. | 260—37 |
| 3,070,560 | 12/62 | Metevia | 260—37 |

MURRAY TILLMAN, *Primary Examiner.*

WILLIAM H. SHORT, *Examiner.*